(12) United States Patent
Yu

(10) Patent No.: US 12,081,437 B2
(45) Date of Patent: Sep. 3, 2024

(54) PROBABILISTIC FILTERS FOR USE IN NETWORK FORWARDING AND SERVICES

(71) Applicant: VMware LLC, Palo Alto, CA (US)

(72) Inventor: Heeyeol Yu, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 229 days.

(21) Appl. No.: 17/574,270

(22) Filed: Jan. 12, 2022

(65) Prior Publication Data

US 2023/0224250 A1 Jul. 13, 2023

(51) Int. Cl.
*H04L 47/127* (2022.01)
*H04L 47/28* (2022.01)
*H04L 47/32* (2022.01)

(52) U.S. Cl.
CPC ............ *H04L 47/127* (2013.01); *H04L 47/28* (2013.01); *H04L 47/32* (2013.01)

(58) Field of Classification Search
CPC . H04L 43/026; H04L 45/7453; H04L 45/745; H04L 45/02; H04L 45/24; H04L 45/7459; H04L 47/127; H04L 47/28; H04L 47/32; H04L 45/38; H04L 49/3009; H04L 41/142; H04L 45/74; H04L 69/22; H04L 2101/622; H04L 67/1023
See application file for complete search history.

(56) References Cited

U.S. PATENT DOCUMENTS

| | | | |
|---|---|---|---|
| 7,369,557 B1 | 5/2008 | Sinha | |
| 7,672,236 B1 | 3/2010 | Karunakaran et al. | |
| 7,865,608 B1 * | 1/2011 | Schuba | H04L 45/00 709/231 |
| 7,877,515 B2 | 1/2011 | Andersson et al. | |
| 8,259,585 B1 * | 9/2012 | S P | H04L 45/125 370/237 |
| 8,886,827 B2 * | 11/2014 | Goel | H04L 45/748 709/238 |
| 9,264,313 B1 | 2/2016 | Manuguri et al. | |
| 9,917,727 B2 | 3/2018 | Hong et al. | |
| 10,158,573 B1 * | 12/2018 | Lee | H04L 47/125 |
| 10,298,450 B2 | 5/2019 | Hong et al. | |
| 10,715,383 B2 | 7/2020 | Hong et al. | |
| 11,044,150 B2 | 6/2021 | Hong et al. | |
| 11,108,812 B1 * | 8/2021 | Krishnan | H04L 45/64 |
| 2005/0055435 A1 | 3/2005 | Gbadegesin et al. | |
| 2005/0223102 A1 | 10/2005 | Zhang et al. | |
| 2005/0249199 A1 | 11/2005 | Albert et al. | |
| 2006/0233106 A1 | 10/2006 | Achlioptas et al. | |

(Continued)

OTHER PUBLICATIONS

Non-Published Commonly Owned Related U.S. Appl. No. 17/574,254 with similar specification, filed Jan. 12, 2022, 33 pages, VMware, Inc.

*Primary Examiner* — Wutchung Chu
(74) *Attorney, Agent, or Firm* — Quarles & Brady LLP (57) ABSTRACT

Some embodiments of the invention provide novel methods for using probabilistic filters to keep track of data message flows that are processed at an element (e.g., forwarding element or middlebox service element) of a network. In some embodiments, the method iteratively switches between two probabilistic filters as the active and backup filters as a way of maintaining and refreshing its active probabilistic filter without the need for maintaining time values for removing outdated records from its active filter.

18 Claims, 9 Drawing Sheets

(56) References Cited

U.S. PATENT DOCUMENTS

| | | | |
|---|---|---|---|
| 2007/0237079 A1* | 10/2007 | Whitehead | H04L 43/00 370/235 |
| 2008/0232275 A1* | 9/2008 | Eswaran | H04L 45/00 370/256 |
| 2008/0256094 A1 | 10/2008 | Gupta et al. | |
| 2010/0149966 A1 | 6/2010 | Achlioptas et al. | |
| 2010/0235495 A1 | 9/2010 | Petersen et al. | |
| 2010/0268935 A1 | 10/2010 | Rodgers et al. | |
| 2011/0069632 A1* | 3/2011 | Chen | H04L 43/026 370/253 |
| 2011/0258199 A1 | 10/2011 | Oliver et al. | |
| 2012/0155266 A1 | 6/2012 | Patel et al. | |
| 2012/0233349 A1* | 9/2012 | Aybay | H04L 47/2441 709/234 |
| 2012/0314709 A1 | 12/2012 | Post et al. | |
| 2013/0212296 A1* | 8/2013 | Goel | H04L 45/742 709/238 |
| 2013/0265875 A1 | 10/2013 | Dyke et al. | |
| 2014/0059544 A1 | 2/2014 | Koganty et al. | |
| 2015/0003453 A1 | 1/2015 | Sengupta et al. | |
| 2015/0095404 A1 | 4/2015 | Perlman | |
| 2015/0350078 A1* | 12/2015 | Azgin | H04L 45/745 370/392 |
| 2015/0350087 A1 | 12/2015 | Hong et al. | |
| 2015/0379430 A1 | 12/2015 | Dirac et al. | |
| 2017/0142226 A1 | 5/2017 | Foy et al. | |
| 2018/0198679 A1 | 7/2018 | Hong et al. | |
| 2019/0273656 A1 | 9/2019 | Hong et al. | |
| 2019/0372906 A1* | 12/2019 | Baldi | H04L 47/70 |
| 2020/0336370 A1 | 10/2020 | Hong et al. | |
| 2021/0314221 A1 | 10/2021 | Hong et al. | |
| 2022/0239675 A1* | 7/2022 | Panse | H04L 63/1416 |
| 2022/0239683 A1* | 7/2022 | Kaliya Perumal | H04L 63/1408 |
| 2023/0006930 A1* | 1/2023 | Lu | H04L 47/2475 |
| 2023/0224249 A1 | 7/2023 | Yu | |

\* cited by examiner

PROBABILISTIC FILTERS FOR USE IN NETWORK FORWARDING AND SERVICES

BACKGROUND

Many network elements often need to maintain state to perform their forwarding or middlebox service operations. These elements can either (1) maintain the state for a particular flow or set of flow in a connection tracking storage that creates a unique record that matches exactly the particular flow or set of flows, or (2) store the state in a probabilistic filter that creates a record that probabilistically matches the particular flow or set of flows. One type of probabilistic filter is a bloom filter, which uses an array of m bits that are written into by k different hash functions. A bloom filter can specify whether a flow has not been seen before with 100% probability, but it cannot specify whether the flow has been seen for such with 100% probability (i.e., it can have false positives). While bloom filters provide a memory-efficient membership query with limited memory provision, stale members in the bloom filter make membership query error-prone with higher false positivity, as bloom filter member set grows with new hot flows.

BRIEF SUMMARY

Some embodiments of the invention provide novel methods for using probabilistic filters to keep track of data message flows that are processed at an element (e.g., forwarding element or middlebox service element) of a network. In some embodiments, the method iteratively switches between two probabilistic filters as the active and backup filters as a way of maintaining and refreshing its active probabilistic filter without the need for maintaining time values for removing outdated records from its active filter.

A network element in some such embodiments maintains (1) a first probabilistic filter as an active filter to keep track of a first set of data message flows processed by the network element during a first time period, and (2) a second probabilistic filter as a backup filter to keep track of a second set of data message flows, which is a sampled smaller subset of the first set of data message flows, processed by the network element during the first time period. Each of these filters in some embodiments comprises several records that are stored in one or more storages (e.g., in memory of a computer). In some embodiments, each location in each storage stores either a default value or a set value. In some embodiments, each probabilistic filter is a bloom filter that for each data messages that the filter processes, has a filter with several "set" values (e.g., with several "1" values) at several storage locations identified by several hash addresses generated by several hash functions that are performed on a key (e.g., a five-tuple value, an L4 value, an L7 value, etc.) that is extracted from the data message.

At a start of a second time interval, the method resets the first probabilistic filter (e.g., sets all the storage locations that store records for this filter to a default value). In the second time period, the method then uses (1) the second probabilistic filter as the active filter to keep track of a third set of data message flows processed by the network element during this time period, and (2) the first probabilistic filter as the backup filter to keep track of a fourth set of data message flows, which is a sampled smaller subset of the third set of data message flows, processed by the network element during the second time period.

In some embodiments, the method continues to iteratively switch between the first and second probabilistic filters as the active and backup filters, with each iteration starting by resetting the current active filter before designating it as the new backup filter and the current backup filter as the new active filter. Given that the backup filter in each iteration only stores filter values for a smaller subset of sampled data message flows, the backup filter during each period is more likely to store the more recent flows (i.e., recency) and the flows with the higher data message exchange rates (i.e., frequency), rather than the older flows or the flows with the lower data message exchange rates. Each time the current backup filter becomes the new active filter for the next time period, the new active filter ends up being refreshed as it is less likely to have filter records for older flows or flows with lower data exchange rates.

During each time period, the method uses the active filter for that time period to determine whether received data messages are part of flows previously processed by the network element and based on the determination, process the received data messages. The network element is a middlebox service element (e.g., a load balancer, a firewall, an intrusion detection system, an intrusion prevention system, a network address translator) that performs a middlebox service operation on data messages that it processes. For instance, in some embodiments, the middlebox service element is a load balancer that processes data messages by distributing the data message flows among a set of destination machines or appliances that further process the data messages. In some such embodiments, the middlebox service element uses the active filter during any time period to determine whether it has previously examined the flow associated with a received data message, and if so, to perform its middlebox service operation based on an operation that it previously performed for this flow.

In other embodiments, the network element is a forwarding element (e.g., a hardware or software switch or router) that processes the data messages by forwarding the data messages to other elements in the network. This forwarding in some embodiments entails forwarding the received data messages to middlebox service elements or gateways that perform or use middlebox service elements. In some such embodiments, the forwarding element uses the active filter during any time period to determine whether it has previously examined the flow associated with a received data message, and if so, to perform its forwarding operation based on an operation that it previously performed for this flow.

Other embodiments use other novel probabilistic filters. For instance, the method of some embodiments computes a probabilistic filter for a received data message at a network element by (1) extracting a key from the received data message, (2) dividing the key into several sub-keys, (3) generating several address values by generating an address value for each sub-key, (4) using the generated address values to retrieve a first set of records from a first set of locations of a storage that comprises a larger second set of locations that store filter values for previously processed data message flows. The method then uses the retrieved first set of records to determine whether the data message is part of a flow previously processed by the network element. Based on the determination, the method processes the received data message. In some embodiments, the probabilistic filter is bloom filter.

In some embodiments, each location in the storage stores either a default value or a set value. The method in some embodiments determines that the received data message is part of a previously processed flow when all the records retrieved from the storage for the data message are equal to the set value. On the other hand, when at least one of the retrieved records equals the default value, the method determines that the received data message is not part of a flow for which the probabilistic filter has a full filter record. In some embodiments, this is the case when the network element has not previously processed the received data message's flow, or when the network element has previously processed this flow but the probabilistic filter no longer has the full filter record for this flow (e.g., the full filter record was removed after being timed out or the probabilistic filter was reset).

When the received data message is not part of a flow for which the probabilistic filter has a full filter record, the method in some embodiments stores a complete filter value for the received data message's flow in the probabilistic filter by storing a set value in any of the first set of locations from which a default value was retrieved for the received data message. Different data message flows can share one or more sub-keys, and hence have their complete filter value share one or more filter records in the storage. Because of this, the probabilistic filter can be much smaller as different complete filter values for different flows can share one or more portions of filter values. This more efficient probabilistic filter is used in different embodiments to assist in the operations of a middlebox service element or a forwarding element, in the same way as the above-described embodiments that use active and backup probabilistic filters. Also, this more efficient probabilistic filter is used in some embodiments in conjunction with the active/backup approach described above.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide novel methods for using probabilistic filters to keep track of data message flows that are processed at an element (e.g., forwarding element or middlebox service element) of a network. In some embodiments, the method iteratively switches between two probabilistic filters as the active and backup filters as a way of maintaining and refreshing its active probabilistic filter without the need for maintaining time values for removing outdated records from its active filter.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer mod.

Figure 1:
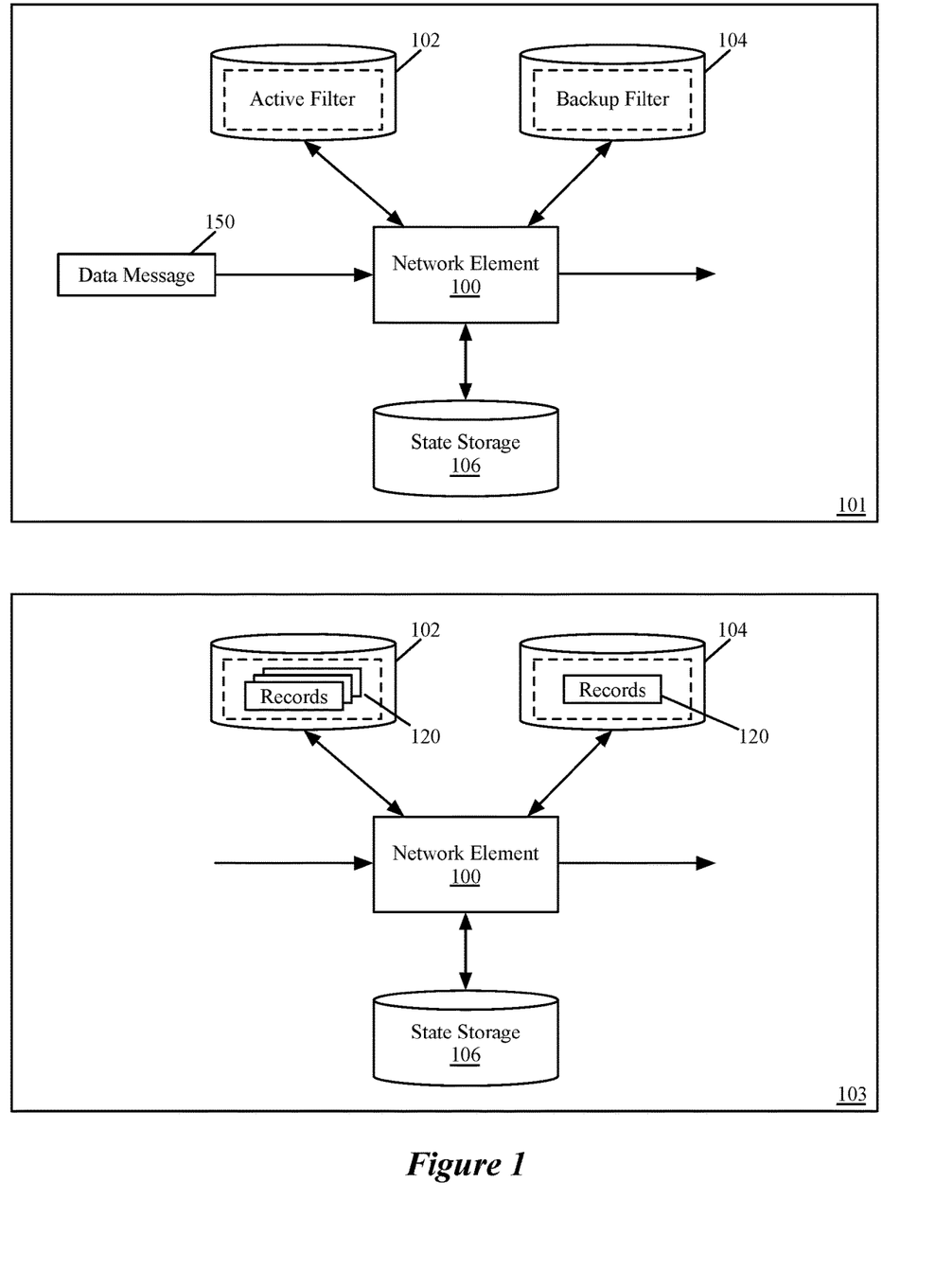
FIG. 1 illustrates that, during a first time period, a network element stores the active probabilistic filter in a first data storage while storing a backup probabilistic filter in a second data storage.
Figure 2:
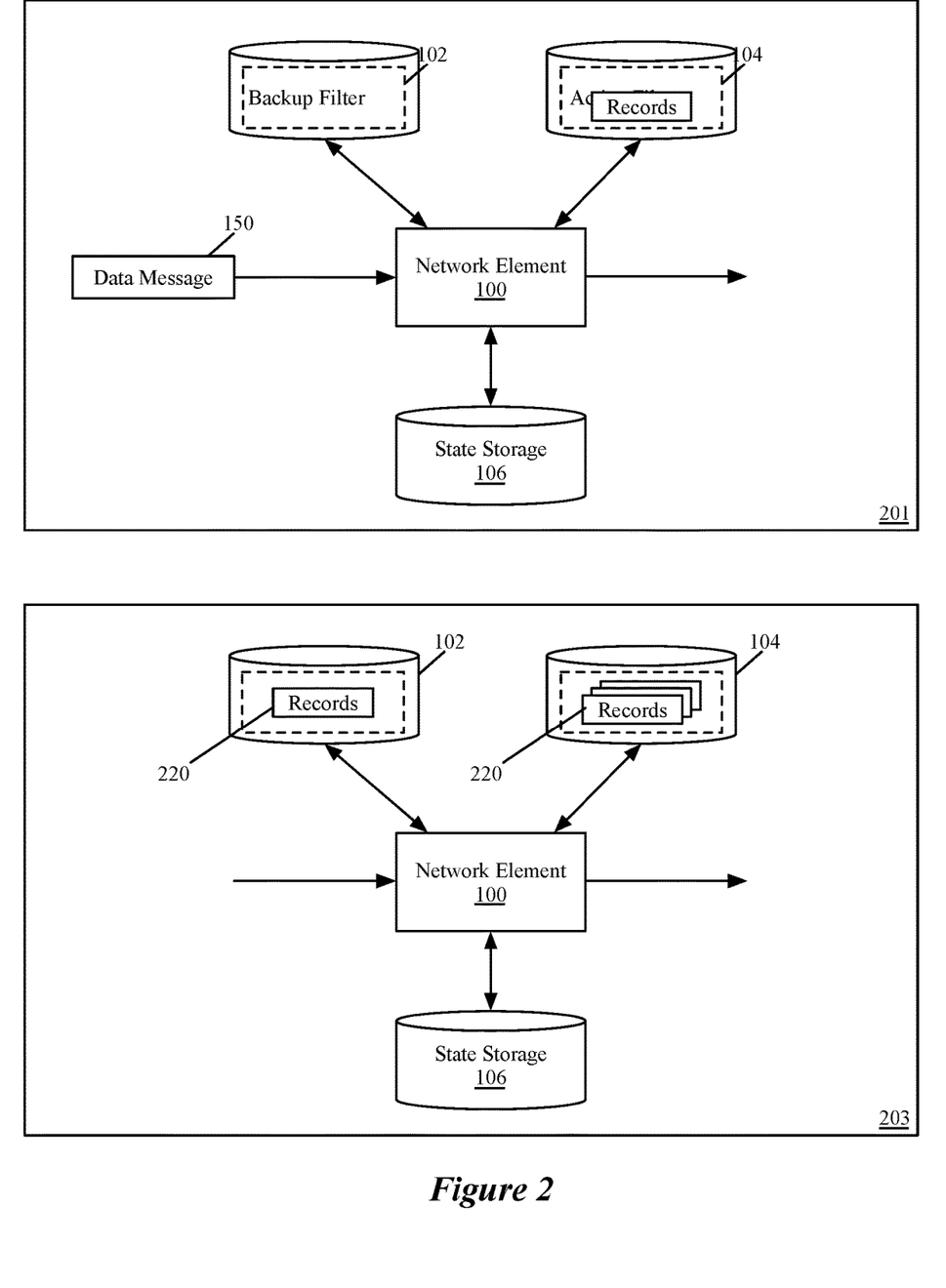
FIG. 2 illustrates two operational stages of the two storages at the start and end of the second time interval after the first time interval.
Figure 3:
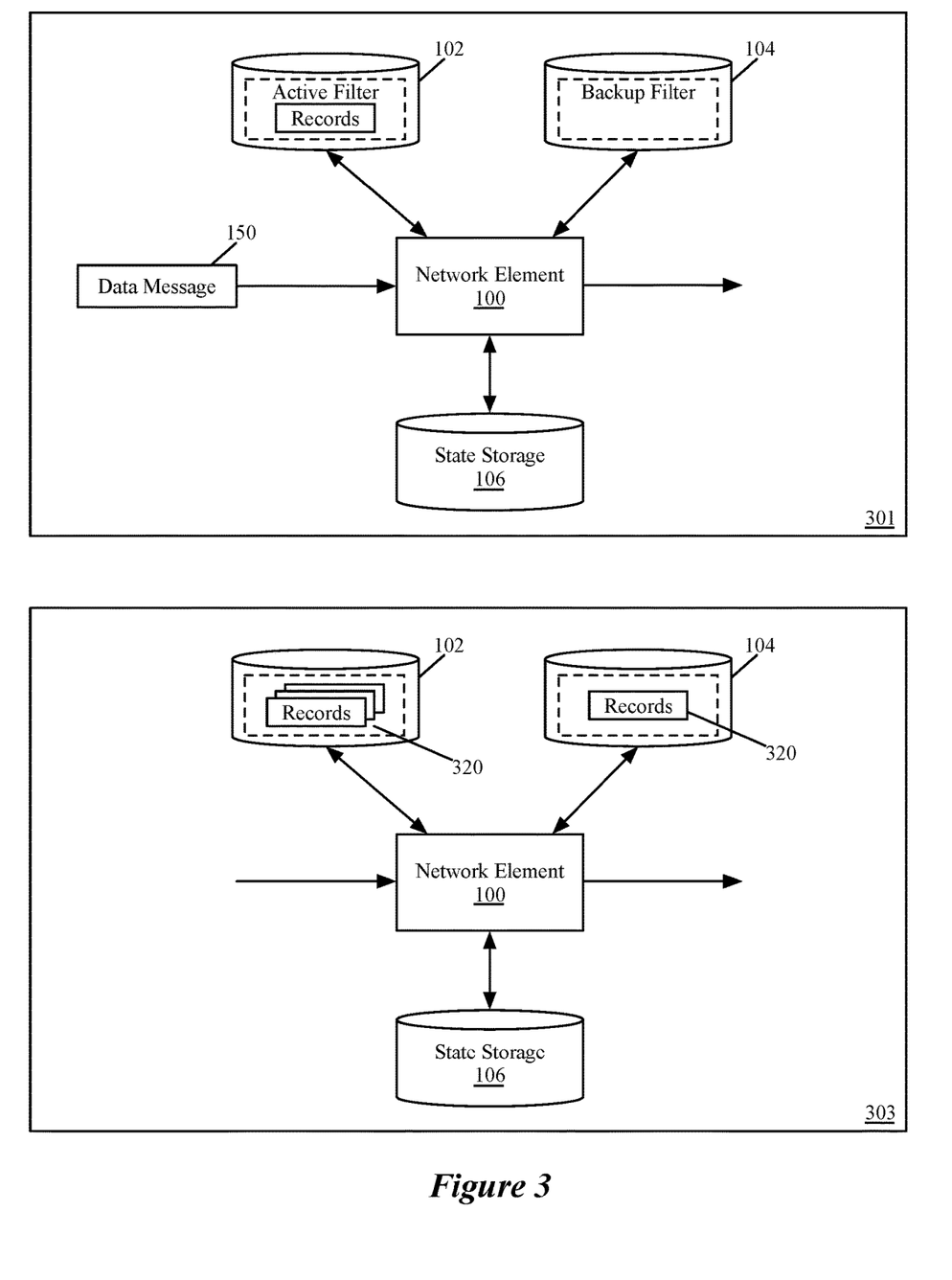
FIG. 3 illustrates two operational stages of the two storages at the start and end of the third time interval after the second time interval.

FIGS. 1-3 illustrate a network element 100 that uses the method of some embodiments. These figures show the operation of the network element 100 during three successive time periods. During each of these periods, the network element 100 uses one of two storages 102 (or 104) to store the active probabilistic filter and the other storage 104 (or 102, respectively) to store the backup probabilistic filter. In some embodiments, each location in each storage stores either a default value or a set value (e.g., either a 0 or a 1).

Each figure has two stages with the first stage 101, 201 or 301 showing the state of the two storages at the start of the figure's associated time period, and the second stage 103, 203 or 303 showing the state of the two storages at the end of the figure's associated time period. The two storages 102 and 104 are two data storage structures that are stored in one physical storage in some embodiments, while they are two data storage structures that are stored in two different physical storages in other embodiments.

In each time period, the active probabilistic filter stores filter values for each data message flow processed by the network element 100, while the backup probabilistic filter stores filter values for a smaller, sampled set of data message flows processed by the network element 100. When the network element 100 finds a set of filter values in the active probabilistic filter for a flow of a data message 150 that it processes during a time period, the network element 100 then uses one or more state values that it previously stored for the data message's flow in a state storage 106 to process the data message's flow.

FIG. 1 illustrates that, during a first time period, the network element 100 stores the active probabilistic filter in the first data storage 102 while storing the backup probabilistic filter in the second data storage 104. The active probabilistic filter keep track of a first set of data message flows processed by the network element during the first time period, while the backup probabilistic filter keeps track of a second set of data message flows processed by the network element during the first time period.

The second set of data message flows in some embodiments is a sampled smaller subset of the first set of data message flows. For instance, in some embodiments, the network element 100 stores, in the active filter, filter values for each data message flow that it processed during each time period, but only stores, in the backup filter, filter values for the flow associated with each Nth data message (e.g., $50^{th}$, $100^{th}$, $500^{th}$, $1000^{th}$, etc.) that the network element processes during the time period. Consequently, the backup filter during the first time period (as well as during any of the other time periods) stores fewer filter records than the active filter.

FIG. 1 conceptually illustrates the smaller amount of records in the backup probabilistic filter stored in the storage 104. Specifically, the second stage 103 of this figure (which illustrates the state at the active and backup filters at the end of the first time period) shows fewer filter records 120 in backup filter stored in the storage 104 than the in the active probabilistic filter stored in the storage 102.

In some embodiments, each probabilistic filter is a bloom filter. A bloom filter is a space-efficient probabilistic data structure used by a network element to test whether a data message is part of a data message flow previously analyzed by the network element. In some embodiments, a bloom filter includes an array of m bits that are written into by k different hash functions.

False positive matches are possible with a bloom filter when collision free hash functions are not used, but false negatives are not. This is because two different data message flows might map to the same bloom filter record because of collision of the hash functions used to compute the bloom filter, but the same flow produces the same bloom filter record each time. In some embodiments, the bloom filter records (e.g., records 120 in FIG. 1) include groups of "set" values that are specified in the bloom filter array for groups of flows that are processed by the bloom filter and that are mapped to the location of the set values by the hash generators of the bloom filter.

Figure 4:
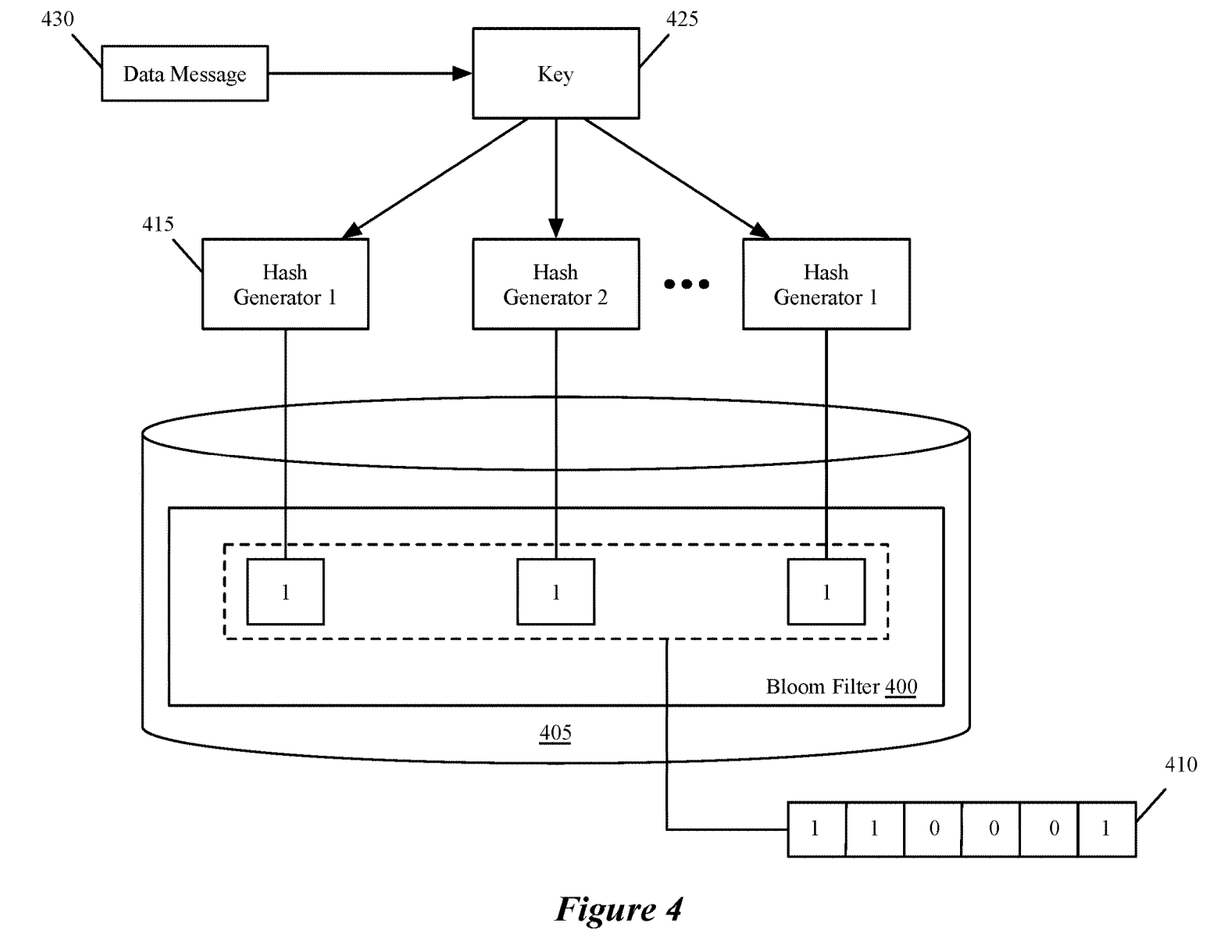
FIG. 4 illustrates an example of a bloom filter array of some embodiments.

FIG. 4 illustrates an example of a bloom filter array 410 of some embodiments. The bloom filter array 410 includes several "set" values (e.g., with several "1" values) at several locations in a storage 405 that are at addresses specified by several hash generators 415. Each hash generator applies a different hash function on a key 425 (e.g., a five-tuple value, an L4 value, an L7 value, etc.) that is extracted from a data message 430, in order to produce a different address for a different location in the storage 405.

In some embodiments, the bloom filter maintains a separate set of bits for each hash generator such that the total number of bits is divided by the number of hash values used for the bloom filter (e.g., four thousand bits may be allocated for a bloom filter using four hash generator, each hash generator being allocated a corresponding set of one thousand bits). The bloom filter of some embodiments enters a set value (e.g., a "1" bit) at each location identified by a hash value produced by a hash generator for the keys extracted from the flows processed by the bloom filter.

The bloom filter of some embodiments has a probabilistic "hit" record for a flow (specifying that the flow has most probably been processed by the bloom filter before) when a set value is stored at each storage location in the bloom filter array that corresponds to each address generated by each hash generator of the bloom filter. This bloom filter produces a miss for a flow when at least one of these storage locations identified for the flow by one of the hash generators does not store a "set" value.

When the bloom filter is used to store additional state for a flow that it has processed (e.g., additional connection tracking state, such as a specific destination IP (DIP) address to replace a destination VIP address in the flow for a load balancer that uses the bloom filter), some embodiments use the attributes of the bloom filter record (e.g., the bloom filter index associated with the bloom filter record, or the value expressed by the bloom filter record) to identify a location in a connection tracking storage to store this additional state. In some embodiments, a larger M-bit bloom filter is composed of multiple smaller m-bit bloom filters to identify more candidate locations for storing bloom filter records for flows for which the hash generators produce the same hash address values. In such embodiments, the bloom filter that has a record for the flow returns positive query and the corresponding tracking state is then retrieved.

FIG. 2 illustrates two operational stages 201 and 203 of the two storages 102 and 104 at the start and end of the second time interval after the first time interval. As shown by the first operational stage 201, the records in the storage 102 at this time have been reset as this storage now stores the backup probabilistic filter, while the previous backup probabilistic filter stored in storage 104 now has been designated as the active probabilistic filter. During the second time period, the network element 100 uses (1) the probabilistic filter in the storage 104 as the active filter to keep track of a third set of data message flows processed by the network element during this time period, and (2) the probabilistic filter in the storage 102 as the backup filter to keep track of a fourth set of data message flows, which is a sampled smaller subset of the third set of data message flows, processed by the network element during the second time period.

The first stage 201 shows the storage 102 with no records in order to convey that the backup probabilistic filter is reset at the start the second time interval to be empty. As in the first time period, the backup filter during the second time period stores fewer filter records than the active filter. FIG. 2 conceptually illustrates the smaller amount of records in the backup filter by showing in its second stage 203 (which illustrates the state of the active and backup filters at the end of the second time period) fewer filter records 220 in the storage 102 (that stores the backup filter) than the in the storage 104 (that stores the active probabilistic filter).

In some embodiments, the network element 100 continues to iteratively switch between the first and second probabilistic filters as the active and backup filters, with each iteration starting by resetting the current active filter before designating it as the new backup filter and the current backup filter as the new active filter. Given that the backup filter in each iteration only stores filter values for a smaller subset of sampled data message flows, the backup filter during each period is more likely to store the more recent flows and the flows with the higher data message exchange rates, rather than the older flows or the flows with the lower data message exchange rates. Each time the current backup filter becomes the new active filter for the next time period, the new active filter ends up being refreshed as it is less likely to have filter records for older flows or flows with lower data exchange rates.

FIG. 3 illustrates two operational stages 301 and 303 of the two storages 102 and 104 at the start and end of the third time interval after the second time interval. As shown by the first operational stage 301, the records in the storage 104 at this time have been reset as this storage now stores the backup probabilistic filter, while the previous backup probabilistic filter stored in storage 102 now has been designated as the active probabilistic filter. During the third time period, the network element 100 uses (1) the probabilistic filter in the storage 102 as the active filter to keep track of a fifth set of data message flows processed by the network element during this time period, and (2) the probabilistic filter in the storage 104 as the backup filter to keep track of a sixth set of data message flows, which is a sampled smaller subset of the fifth set of data message flows, processed by the network element during the third time period.

The first stage 301 shows the storage 104 with no records in order to convey that the backup probabilistic filter is reset at the start the third time interval to be empty. As in the first time period, the backup filter during the third time period stores fewer filter records than the active filter. FIG. 3 conceptually illustrates the smaller amount of records in the backup filter by showing in its second stage 303 (which illustrates the state of the active and backup filters at the end of the third time period) fewer filter records 320 in the storage 104 (that stores the backup filter) than the in the storage 102 (that stores the active probabilistic filter).

During each time period, the network element uses the active filter for that time period to determine whether received data messages are part of flows previously processed by the network element, and if so, processes the received data messages based on state that it previously stored in its state storage 106 for the data message flows. The network element 100 is a middlebox service element (e.g., a load balancer, a firewall, an intrusion detection system, an intrusion prevention system, a network address translator) that performs a middlebox service operation on data messages that it processes.

Figure 5:
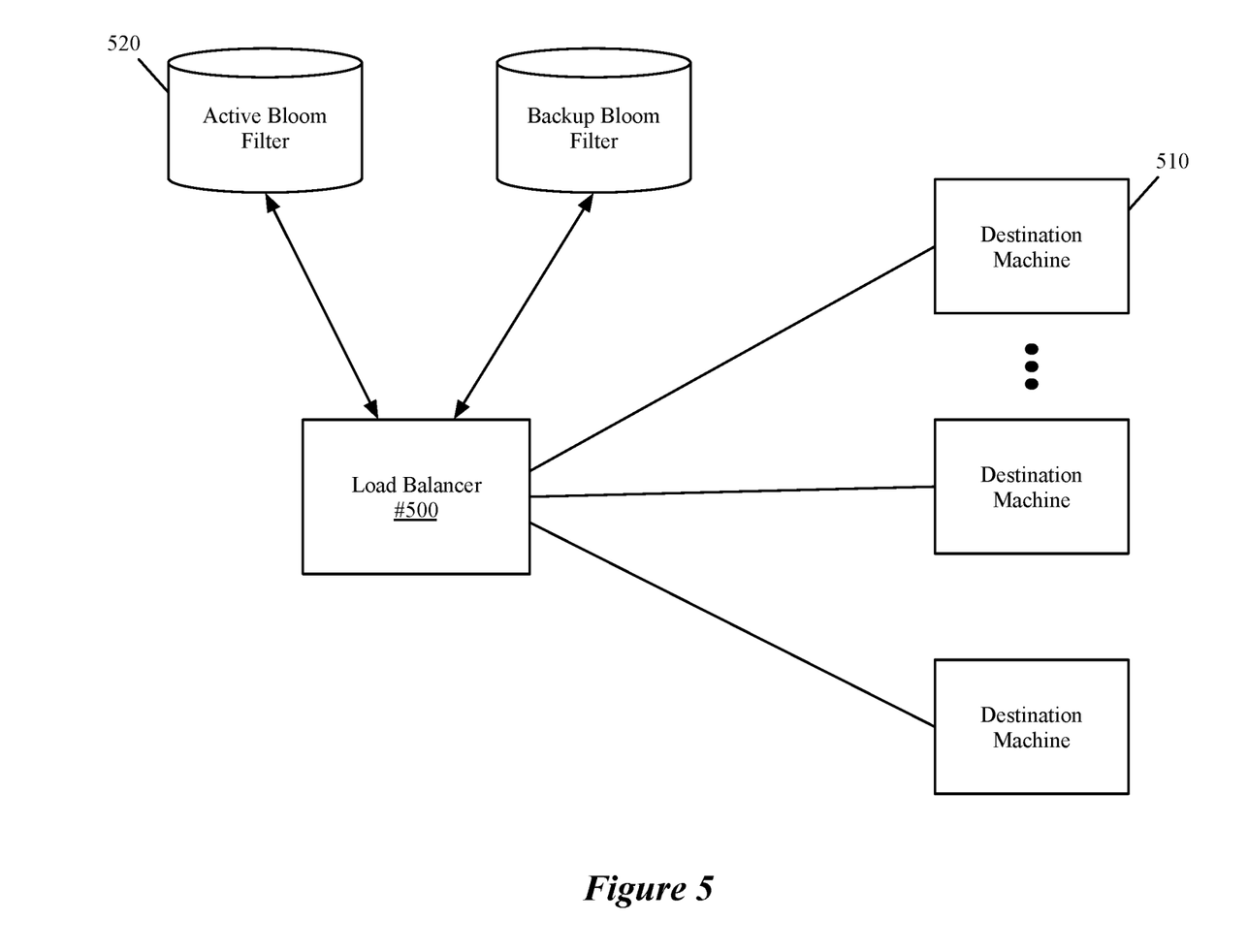
FIG. 5 illustrates that a load balancer that uses some embodiments of the invention.

For instance, FIG. 5 illustrates that the network element 100 is a load balancer 500 in some embodiments. This load balancer 500 distributes the data message flows that are addressed to a common network address (e.g., virtual IP address) associated with several destination machines 510 (e.g., such as a set of appservers, a set of webservers or a set of database servers) among the destination machines, which further process the data messages.

The load balancer 500 maintains and uses an active bloom filter 520 for a particular time period to determine whether it has previously examined the flow associated with a received data message in that time period, and if so, to perform its load balancing operation based on what it did previously for this flow in that time period. For instance, the load balancer 500 in some embodiments uses the active bloom filter 520 during a transition period when one or more destination machines 510 are being added to the group of destination machines.

In some embodiments, the load balancer uses the bloom filter during the transition period to determine whether a flow was initially received during an observation sub-period of the transition period or whether the flow was initially received during a subsequent re-dispatching period of the transition period. During the observation period, new packet flows are not sent to the new destination machine, but are used to set entries in the bloom filter. During a re-dispatching period, new packet flows can be sent to the new node when the packet's flow does not match an entry in the probabilistic filter. This embodiment is further described in U.S. Pat. No. 11,044,150.

In other embodiments, the network element 100 is another type of middlebox service element (e.g., a firewall, an intrusion detection system, an intrusion prevention system, a network address translator) that performs a middlebox service operation on data messages that it processes. In some embodiments, the middlebox service element uses the active filter during any time period to determine whether it has previously examined the flow associated with a received data message, and if so, to perform its middlebox service operation based on an operation that it previously performed for this flow.

In other embodiments, the network element 100 is a forwarding element (e.g., a hardware or software switch or router) that processes the data messages by forwarding the data messages to other elements in the network. This forwarding in some embodiments entails forwarding the received data messages to middlebox service elements or gateways that perform or use middlebox service elements. In some such embodiments, the forwarding element uses the active filter during any time period to determine whether it has previously examined the flow associated with a received data message, and if so, to perform its forwarding operation based on an operation that it previously performed for this flow.

Figure 6:
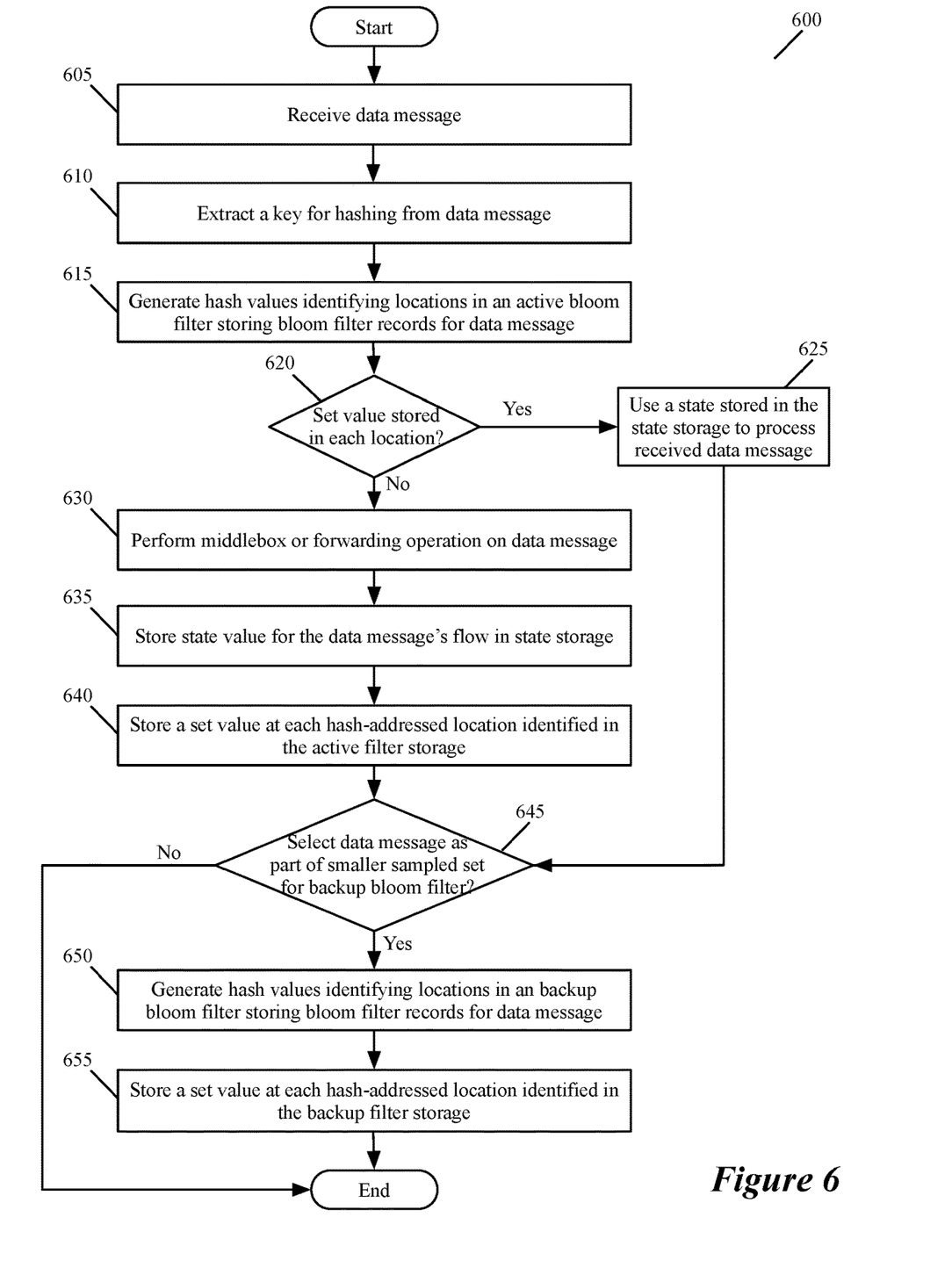
FIG. 6 illustrates a process that a network element performs in some embodiments to maintain and use the active and backup bloom filters.

FIG. 6 illustrates a process 600 that the network element 100 performs in some embodiments to maintain and use the active and backup bloom filters. The network element 100 performs the process 600 each time it receives a data message in some embodiments. As shown, the process starts when the network element receives (at 605) a data message. Next, at 610, the process 600 extract a key for hashing from the received data message. In some embodiments, the key is the data message's five tuple header values (i.e., source and destination IP addresses, source and destination port addresses, and protocol). In other embodiments, the key includes just the L4 header values of the received data message in other embodiments. In still other embodiments, the key includes L7 values instead of or in conjunction with L2, L3 and L4 header values.

At 615, the process 600 uses several hash functions to generate several hash values from the extracted key, or uses one hash function to generate a hash value that it then divides into several hash values. Each of the several hash values is an address of a location in the storage being used to store the active bloom filter for the current time period. Hence, all the generated hash values together identify several locations (which can be non-contiguous locations) in the storage that collectively represent the location of a conceptual active bloom filter record for the received data message's flow. In other words, all the records at all the generated hash-addressable locations collectively form the conceptual active bloom filter record for the received data message's flow.

Each of the identified locations will store a set value (e.g., a "1" value) when the network element has processed in the same time period another data message in the same flow as the received data message. Hence, at 620, the process 600 determines whether a set value is stored in each location identified by each hash function at 615. If so, the process 600 determines that it has previously examined another data message in the same flow, and then uses (at 625) a state that it stored in the state storage 106 to process the received data message (e.g., uses a previously used hash function to generate another hash for the received data message, and uses this hash to select a destination machine that should get the received data message). From 620, the process transitions to 645, which will be described below.

When the process determines (at 620) that at least location identified at 615 does not store a set value (e.g., stores a default "0" value), the process determines (at 620) that it has not previously examined another data message in the same flow. Hence, it performs (at 630) its middlebox or forwarding operation on the received data message, and stores (at 635) a state value for the data message's flow in its state storage 106. The process 600 also stores (at 640) a set value (e.g., a "1") at each hash-addressed location identified at 615 in the active filter storage, and then transitions to 645.

At 645, the process determines whether it should select the received data message as part of the smaller sampled set of data messages for generating filter records in the backup bloom filter. If not, the process ends. Otherwise, the process 600 (at 650) uses several hash functions to generate several hash values from the extracted key, or uses one hash function to generate a hash value that it then divides into several hash values. Each of the several hash values is an address of a location in the storage being used to store the backup bloom filter for the current time period. Hence, all the generated hash values together identify several locations (which can be non-contiguous locations) in the storage that collectively represent the location of a conceptual backup bloom filter record for the received data message's flow. In other words, all the records at all the generated hash-addressable locations collectively form the conceptual backup bloom filter record for the received data message's flow. At 655, the process 600 then stores a set value (e.g., a "1") at each hash-addressed location identified at 650 in the backup filter storage. After 655, the process 600 ends.

Other embodiments use other novel probabilistic filters. For instance, the method of some embodiments computes a probabilistic filter for a received data message at a network element by (1) extracting a key from the received data message, (2) dividing the key into several sub-keys, (3) generating several address values by generating an address value for each sub-key, (4) using the generated address values to retrieve a first set of records from a first set of locations of a storage that comprises a larger second set of locations that store filter values for previously processed data message flows.

The method then uses the retrieved first set of records to determine whether the data message is part of a flow previously processed by the network element. In some embodiments, each location in the storage stores either a default value or a set value (e.g., stores either a 0 or a 1). In these embodiments, the method determines whether the data message is part of a previously processed flow by determining whether the retrieved first-set records only store set values. Based on its determination, the method processes the received data message. In some embodiments, the probabilistic filter is bloom filter.

Figure 7:
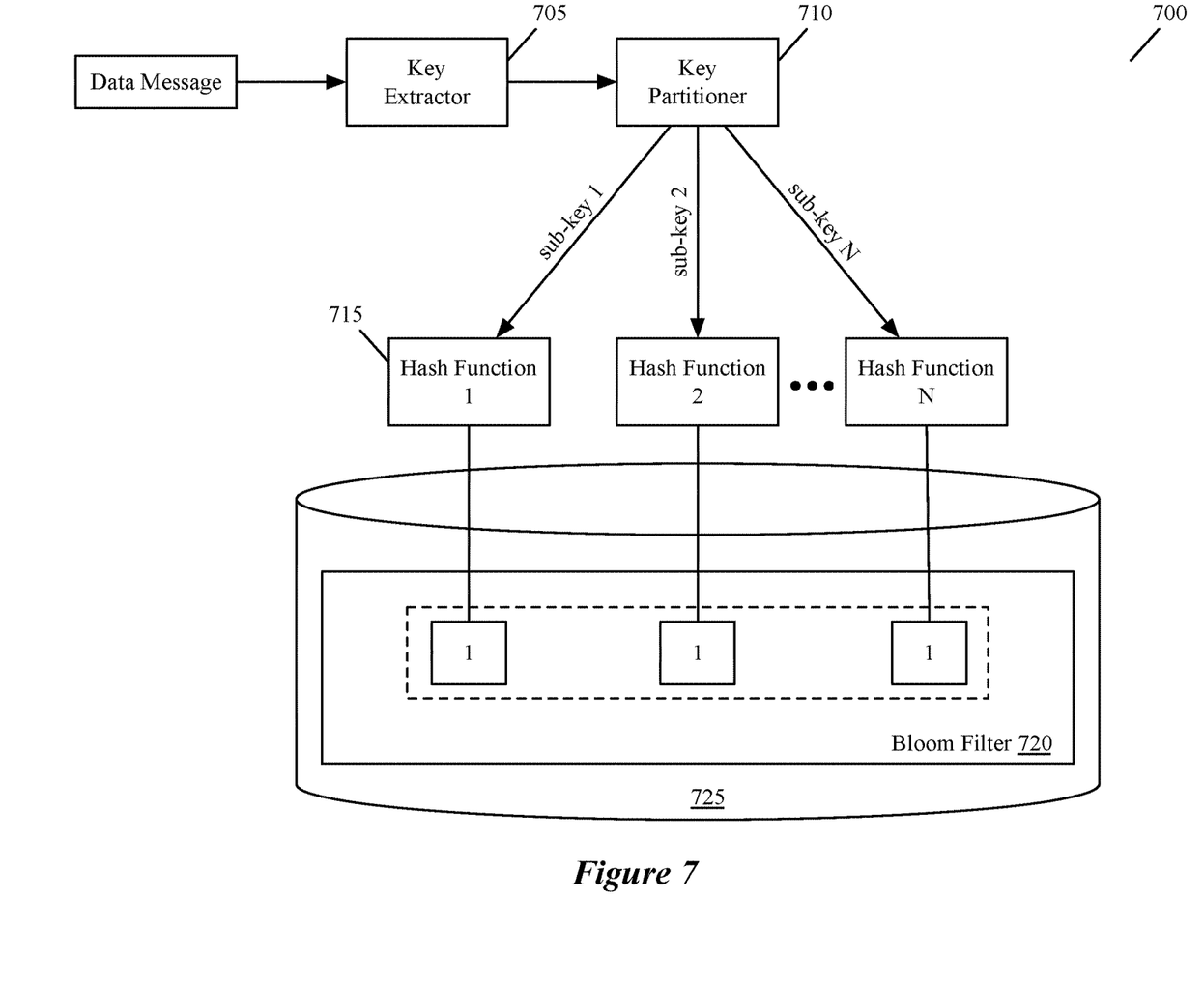
FIG. 7 illustrates a bloom filter generator that uses the above-described key-partitioning method of some embodiments.

FIG. 7 illustrates a bloom filter generator 700 that uses the above-described key-partitioning method of some embodiments. This generator 700 includes a key extractor 705, a key partitioner 710, several hash function generators 715 and a bloom filter 720 stored in a storage 725. The key extractor produces (i.e., extracts) a key from a data message received by a network element that uses the bloom filter generator 700. In some embodiments, the extracted key includes the data message's five tuple header values (i.e., source and destination IP addresses, source and destination port addresses, and protocol), or its L4 header values. In other embodiments, the extracted key includes the data message's L2 and/or L7 values in addition to or instead of its five-tuple or L4 values. To extract the L7 value(s) of the received data message, the key extractor 705 performs deep packet inspection in some embodiments on the received data message or its flow.

The key partitioner 710 divides the extracted key into several sub-keys. In some embodiments, the sub-keys are non-overlapping portions of the extracted key. When combined, the sub-keys form the entirety of the extracted key in some embodiments. In some embodiments, the key partitioner 710 divides the extracted key into several equal-sized partitions that contiguously follow one another and that serve as the sub-keys. In other embodiments, the partitioner 710 generates different sized partitions (sub-keys).

In some embodiments, each hash generator 715 generates a hash value for one sub-key, and the hash values generated for the different sub-keys identify different locations in the storage 725 that stores the bloom filter 720. In other words, the hash generators 715 do not produce colliding hash values for different sub-keys of the same key in some embodiments. To accomplish this, each hash generator 715 in some embodiments produces hash value addresses for a different range of the storage 725.

The different identified storage locations (i.e., the storage locations identified by the hash generators 715 for the produced sub-keys of a data message) identify the bloom filter record associated with the data message. When the bloom filter generator 700 has not processed another data message in the same flow as the current data message, the bloom filter record (i.e., all the storage locations identified by the hash generators 715 for the produced sub-keys of the current data message) stores at least one default value (e.g., at least one "0" value).

On the other hand, when the bloom filter generator 700 has processed another data message in the same flow, the bloom filter record (i.e., all the storage locations identified by the hash generators 715 for the produced sub-keys of the current data message) stores a string of "set" values (e.g., a string of "1" values). When collision free hash functions are not used, this would also occur when the hash values produced for the current data message's flow collide with the hash values produced for another data message flow. This is not ideal, but such events do occur when collision free hash functions are not used. In such cases, the operation for which the network element uses the bloom filter has to be able to withstand such false positives.

Accordingly, given that each location in the storage 725 stores either a default value or a set value in some embodiments, the bloom filter generator 700 in these embodiments determines that the received data message is part of a previously processed flow when all the records in the storage 725 that are identified by the generated hash value addresses are equal to the set value. On the other hand, when at least one of the identified records equals the default value, the bloom filter generator 700 determines that the received data message is not part of a flow for which the probabilistic filter has a full filter record. In some embodiments, this is the case not only when the bloom filter generator 700 has not previously processed the received data message's flow, but is also the case when the network element has previously processed this flow but the probabilistic filter no longer has the full filter record for this flow (e.g., the full filter record was removed after being timed out or the probabilistic filter was reset).

When the received data message is not part of a flow for which the probabilistic filter has a full filter record, the method of some embodiments stores a complete filter value for the received data message's flow in the probabilistic filter by storing a set value in any of the first set of locations from which a default value was retrieved for the received data message. Different data message flows can share one or more sub-keys, and hence have their complete filter value share one or more filter records in the storage. Because of this, the bloom filter 720 can be much smaller as different complete filter values for different flows can share one or more portions of filter values. This more efficient bloom filter is used in different embodiments to assist in the operations of a middlebox service element or a forwarding element, in the same way as the above-described embodiments that use active and backup probabilistic filters. Also, this more efficient probabilistic filter is used in some embodiments in conjunction with the active/backup approach described above.

Figure 8:
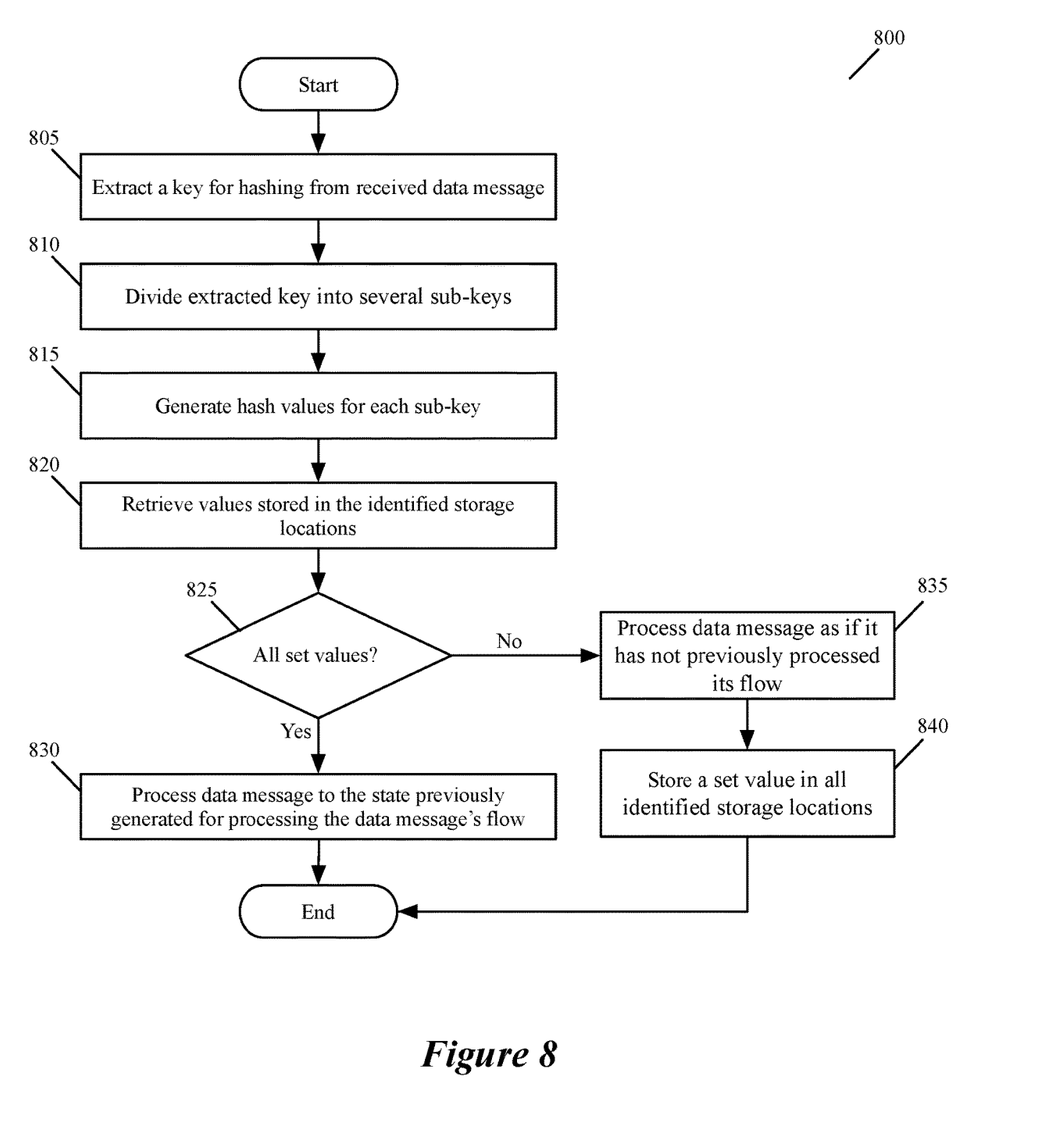
FIG. 8 illustrates a process that the bloom filter generator performs in some embodiments to process a data message.

FIG. 8 illustrates a process 800 that the bloom filter generator 700 performs in some embodiments to process a data message. As shown, the process 800 initially extracts (at 805) a key from the data message received by a network element that uses the bloom filter generator 700. This key can be the data message's five tuple header values, its L4 header values or its L2 and/or L7 values in addition to or instead of its five-tuple or L4 values.

Next, at 810, the process divides the extracted key into several sub-keys. For each sub-key, the process then produces (at 815) a hash value address. As mentioned above, the different hash values produced for the different sub-keys identify in some embodiments different locations in the storage 725 that stores the bloom filter 720. At 820, the process retrieves the values stored in the storage locations identified at 815.

The process 800 then determines (at 825) whether all the retrieved values are set values. If so, the bloom filter generator 700 has processed another data message in the same flow. Hence, at 830, the process 800 informs the network element to process the data message according to the state that it previously generated for processing the data message's flow. After 830, the process ends.

When one or more of the retrieved values is a default value, the process determines (at 825) that it has not processed another data message in the same flow as the current data message. Hence, the bloom filter generator directs (at 835) the network element to process the data message as if it has not previously processed its flow. At 840, the process 800 also stores a set value in all the storage locations identified by the addresses generated at 815. After 840, the process ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
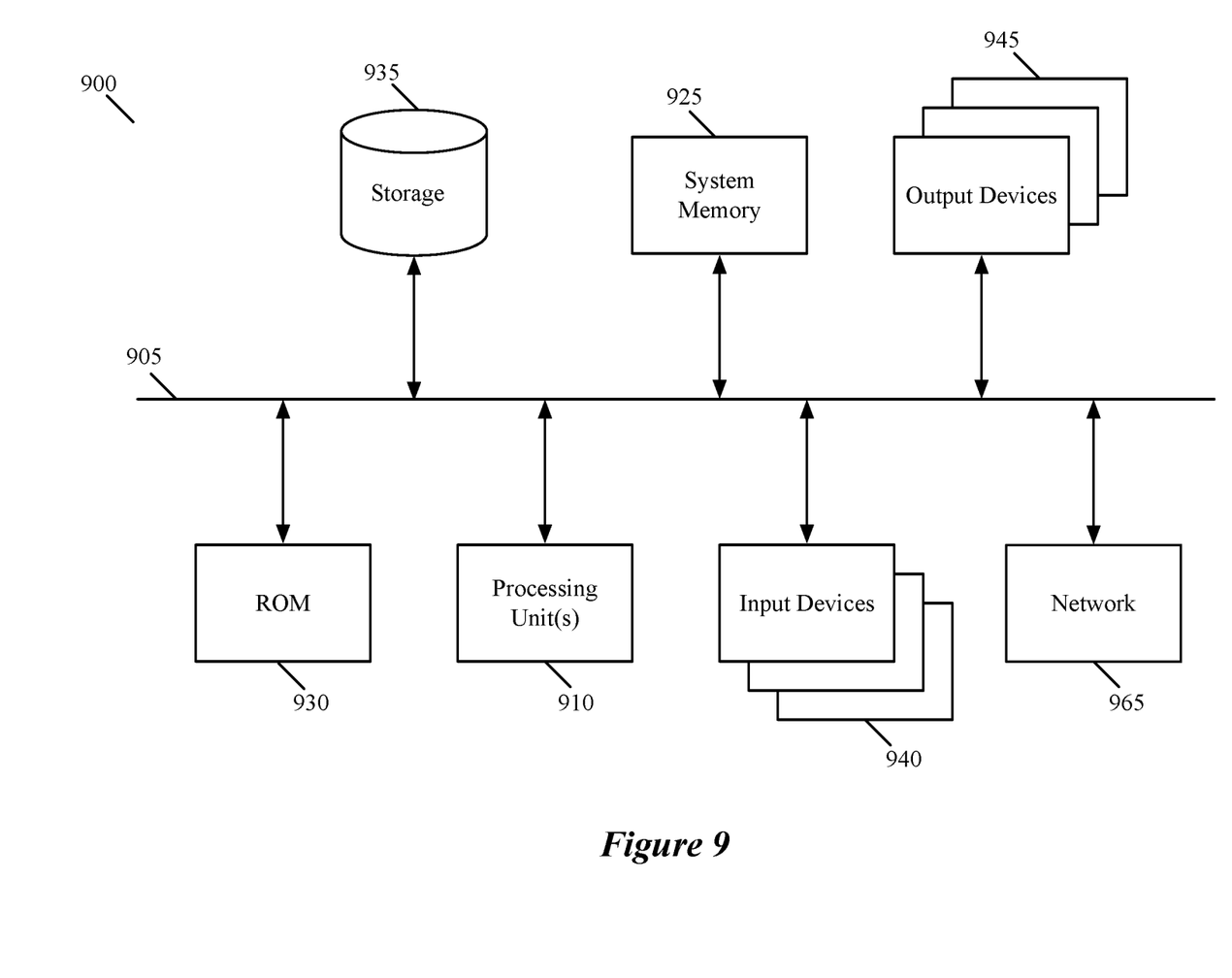
FIG. 9 illustrates a computer system with which some embodiments of the invention are implemented.

FIG. 9 conceptually illustrates a computer system 900 with which some embodiments of the invention are implemented. The computer system 900 can be used to implement any of the above-described computers and servers. As such, it can be used to execute any of the above described processes. This computer system includes various types of non-transitory machine readable media and interfaces for various other types of machine readable media. Computer system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the computer system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments. The read-only-memory (ROM) 930 stores static data and instructions that are needed by the processing unit(s) 910 and other modules of the computer system. The permanent storage device 935, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 935.

Other embodiments use a removable storage device (such as a flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices enable the user to communicate information and select commands to the computer system. The input devices 940 include alphanumeric keyboards and pointing devices (also called "cursor control devices"). The output devices 945 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples computer system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of computer system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of processing data messages forwarded through a network, the method comprising:
   at a network element:
   computing a probabilistic filter for a received data message, said computing comprising:
   extracting a key from the data message;
   dividing the key into a plurality of sub-keys;
   generating a plurality of address values by generating an address value for each sub-key;
   using the generated plurality of address values to retrieve a first plurality of records from a first plurality of locations of a storage that comprises a larger second plurality of locations that store filter values for previously processed data message flows;
   using the retrieved first plurality of records to determine whether the data message is part of a flow previously processed by the network element;
   based on the determination, processing the received data message;
   wherein each of a plurality of data message flows share at least one sub-key and share at least one record in the storage to store a portion of their respective filters.

2. The method of claim 1, wherein the probabilistic filter is a bloom filter.

3. The method of claim 1,
   wherein each location in the storage stores either a default value or a set value;
   wherein using the retrieved first plurality of records comprises determining whether at least one of the retrieved records equals the default value.

4. The method of claim 3, wherein processing the received data message comprises processing the received data message as a data message that is part of a previously processed flow when the determination is that all the retrieved records equal the set value.

5. The method of claim 3 further comprising storing a filter value for the received data message's flow by storing a set value in any of the first plurality of locations from which a default value was retrieved for the received data message.

6. The method of claim 1, wherein the network element is a middlebox service element.

7. The method of claim 6, wherein the middlebox service element is a load balancer that processes data messages by distributing the data message flows among a set of destination machines or appliances that further process the data messages.

8. The method of claim 1, wherein the network element is a forwarding element that processes the data messages by forwarding the data messages to other elements in the network.

9. The method of claim 8, wherein the forwarding element forwards data messages to a middlebox service element or a gateway.

10. A non-transitory machine readable medium storing a program for processing data messages forwarded through a network, the program comprising sets for execution by at least one processing unit of a device, the program comprising sets of instructions for:
    computing a probabilistic filter for a received data message, said computing comprising:
    extracting a key from the data message;
    dividing the key into a plurality of sub-keys;
    generating a plurality of address values by generating an address value for each sub-key;
    using the generated plurality of address values to retrieve a first plurality of records from a first plurality of locations of a storage that comprises a larger second plurality of locations that store filter values for previously processed data message flows;

using the retrieved first plurality of records to determine whether the data message is part of a flow previously processed by the network element;

based on the determination, processing the received data message;

wherein each of a plurality of data message flows share at least one sub-key and share at least one record in the storage to store a portion of their respective filters.

11. The non-transitory machine readable medium of claim 10, wherein the probabilistic filter is a bloom filter.

12. The non-transitory machine readable medium of claim 10, wherein each location in the storage stores either a default value or a set value;

wherein using the retrieved first plurality of records comprises determining whether at least one of the retrieved records equals the default value.

13. The non-transitory machine readable medium of claim 12, wherein the set of instructions for processing the received data message comprises a set of instructions for processing the received data message as a data message that is part of a previously processed flow when the determination is that all the retrieved records equal the set value.

14. The non-transitory machine readable medium of claim 12, wherein the program further comprises a set of instructions for storing a filter value for the received data message's flow by storing a set value in any of the first plurality of locations from which a default value was retrieved for the received data message.

15. The non-transitory machine readable medium of claim 10, wherein the network element is a middlebox service element.

16. The non-transitory machine readable medium of claim 15, wherein the middlebox service element is a load balancer that processes data messages by distributing the data message flows among a set of destination machines or appliances that further process the data messages.

17. The non-transitory machine readable medium of claim 10, wherein the network element is a forwarding element that processes the data messages by forwarding the data messages to other elements in the network.

18. The non-transitory machine readable medium of claim 17, wherein the forwarding element forwards data messages to one of a middlebox service element and a gateway.

* * * * *